Jan. 20, 1959  A. T. FASSERO ET AL  2,869,180
DEVICE FOR CURING TIRE CASINGS
Filed Oct. 24, 1955

INVENTOR.
ANTHONY T. FASSERO
JAMES R. MADDOX
BY
George B White
ATTY.

United States Patent Office 2,869,180
Patented Jan. 20, 1959

2,869,180

DEVICE FOR CURING TIRE CASINGS

Anthony T. Fassero and James R. Maddox, Oakland, Calif.

Application October 24, 1955, Serial No. 542,140

2 Claims. (Cl. 18—45)

This invention relates to a method and device for curing tire casings.

Heretofore in curing tire casings the heat was usually applied from the exterior to the tread or crown of the tire. As the heat dissipated through the tire, it took considerable time before the heat reached the inner portion of the tire tread and this resulted in uneven curing through the depth of the tire tread as well as other disadvantages.

An object of our invention is to provide a method and device whereby heat and pressure can be applied to the interior of the tire casing efficiently so as to positively assure curing of the tread on the tire casing and also materially shorten the time of curing.

The particular features of the invention considered novel are the utilizing of pressure of split matrices for positively sealing the interior of the tire casing by a compressible flap pressed along its edges between and upon a rigid substantially flat cylinder and the inner wall of the tire casing and then admitting air pressure and a heating medium for selected periods into the sealed chamber thus formed within the tire casing; the provision of a diaphragm or extensible flexible half tube open and so arranged that the pressure introduced therein seals the diaphragm effectively against the inside surface of the tire casing in the sealed chamber; the provision of a cylindrical flat rigid curing rim on which is provided a compressible sealing liner or flap the edges of which latter can fold around the edges of the curing rim to be pressed between the tire casing and the edges of the rim; and easily adjustable elements for positioning the rim device in the tire casing.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 3:
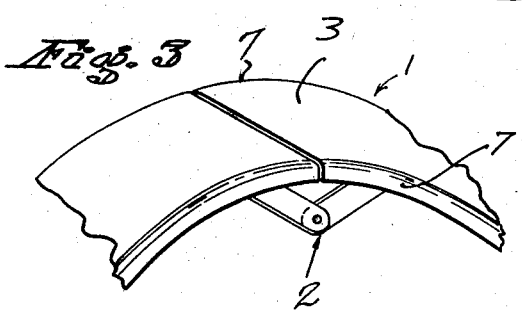
Fig. 3 is a fragmental perspective view of a portion of the curing rim.

In carrying out our invention we utilize a flat generally cylindrical curing rim 1 which is made in collapsible sections with the usual collapsing linkages as indicated at 2 in Fig. 3. The outer periphery of the rigid rim 1 is flat or plane 3 and it is not concave or dished as in previous practice.

Over the steel or rigid rim 1, which is generally cylindrical when assembled, fits a liner or flap 4. This flap 4 is cylindrical and is preferably made of rubber or other resiliently compressible composition and is wider than the width of the rim. The opposite edges of this cylindrical flap 4 are adapted to be folded over the adjacent respective edges 7 of the rigid rim 1, or may be formed with flanges 6, as shown in Fig. 1.

Figure 1:
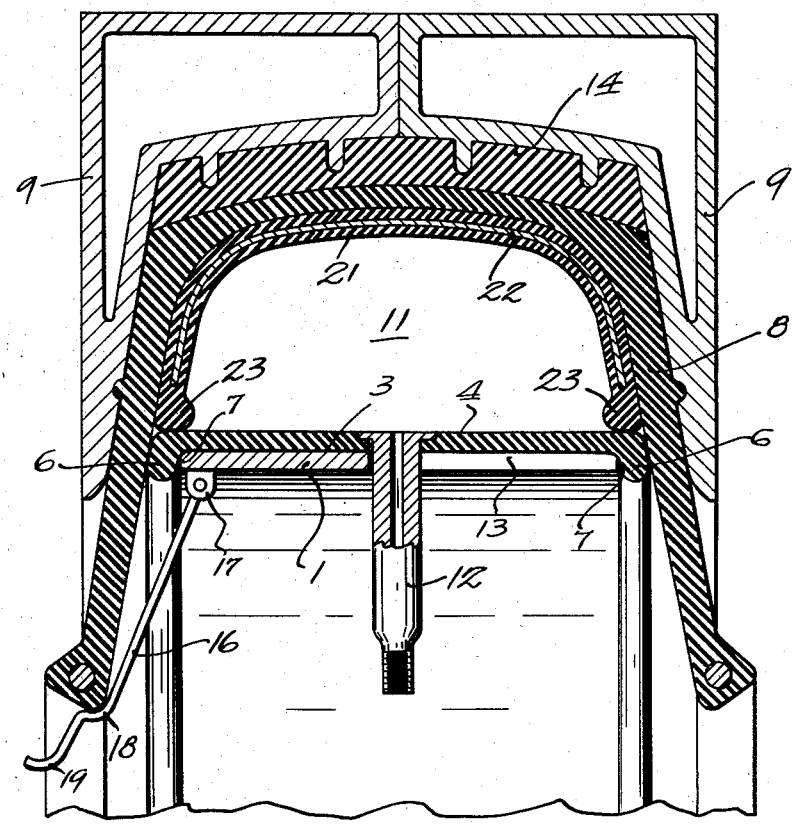
Fig. 1 is a fragmental cross-sectional view showing the tire casing and matrix with our curing rim and device inside of the tire casing.
Figure 2:
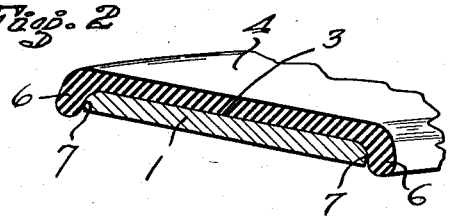
Fig. 2 is a fragmental sectional perspective view of the flap in position on the same.

The rim 1 is inserted in the tire casing 8 with the flap 2 on the same in the position as shown in Fig. 1 and then split matrix sections 9 are closed from the outside upon the opposite sides of the tire casing 8. The pressure thus created squeezes the flat flanges 6 between the edges 7 of the rim 1 and the tire casing 8 so as to form a complete and perfect seal which forms the chamber 11 in the tire casing.

The flap 4 has a usual valve stem 12 secured into it which stem 12 extends through a suitable hole or slot 13 through the rigid rim 1. The valve stem 12 contains a usual air valve for the introduction and holding of a pressure medium.

The matrix sections 9 are heated in any conventional manner and contain the usual design to be impressed upon and cured into the tread or crown 14 of the tire casing.

In order to locate the rim 1 evenly in position inside of the tire casing there are provided a plurality, preferably three, hooks 16 on the inner periphery of the rim along one edge 7, each hook 16 is pivoted on a lug 17 extending from the inner periphery of the rim 1. Each hook 16 has on it two hook indents or depressions 18 and 19 for two different rim diameters of tire casing. One indent or hook portion 18 takes care of the so called 16" diameter and the other hook 19 takes care of so called 15" rim diameter. As the rim 1 is placed in position the respective hook members 16 are swung into position to engage the bead of the tire casing, as shown in Fig. 1, and thereby locate the rim 1 equidistant from the crown and walls of the tire casing 8.

When an inner tube or lining is desired for the curing of a tire, we utilize a diaphragm which consists of a flexible generally cross-sectionally semi-circular or semi-tubular casing liner 21 which has a flexible reinforcing element 22 therein. The circular edges of this liner element 21 are formed with inwardly extended beads 23 which are so curved as to respond to pressure inside of the chamber 11 and be pressed by that pressure outwardly both against the respective sides of the tire casing 8 and inwardly against the flap 4 at the top of the flat flanges 6 so as to prevent any of the steam or air pressure medium introduced into the chamber 11 to escape around the circular edges of the diaphragm or liner element 11.

In the method of curing tires the novel step is the forming of a sealed chamber within the casing of the tire and around the inner periphery of the tire casing by compressing a resiliently compressible flange liner between a cylindrical rigid curing rim and the sides of the tire casing by split curing matrices which latter exert pressure on the outside of the tire casing, and then introducing under pressure a heating medium for heating the inside of the tire casing.

In addition, in connection with other than tubeless tires the provision of the chamber is formed with a liner utilizing the applied pressure to press the edges of the liner against both the bottom and sides of the chamber for completely sealing the same.

The subsidiary step is the location of the rim and its sealing liner uniformly with respect to the beads of the tire casing.

We claim:

1. In a device for curing tire casing in a heated matrix, a curing rim, a resiliently compressible liner surrounding said curing rim on its outer periphery, edges of said liner extending over the opposite respective edges of said rim, and being adapted to be pressed between said edges of said rim and the sides of the tire casing by said matrix for sealing a chamber between said liner and the inner periphery of said tire casing, and means for admitting an inflating medium under pressure into the chamber, the outer periphery of said curing rim being flat and cylindrical, a plurality of locating hook elements hinged to the inside of said curing rim and being adjacent one edge thereof, and selectively engageable hook dents on each of said hook elements engageable with the adjacent bead of the tire casing for locating the said rim in said tire casing at a predetermined distance from said bead.

2. In a device for curing tire casing in a heated matrix, a curing rim, a resiliently compressible liner surrounding said curing rim on its outer periphery, edges of said liner extending over the opposite respective edges of said rim, and being adapted to be pressed between said edges of said rim and the sides of the tire casing by said matrix for sealing a chamber between said liner and the inner periphery of said tire casing, and means for admitting an inflating medium under pressure into the chamber, the outer periphery of said curing rim being flat and cylindrical, a plurality of locating hook elements hinged to the inside of said curing rim adjacent one edge thereof, and selectively engageable hook dents on each of said hook elements engageable with the adjacent bead of the tire casing for locating the said rim in said tire casing at a predetermined distance from said bead, a diaphragm around the inner periphery of the tire casing, and beads on the inner peripheral edges of said diaphragm engageable with the said liner near the portions of said liner extending over the respective edges of said rim for preventing passage of the inflating medium under the back of the diaphragm.

References Cited in the file of this patent

UNITED STATES PATENTS

| | | |
|---|---|---|
| 1,577,881 | Swanson | Mar. 23, 1926 |
| 1,779,385 | Wirgman | Oct. 21, 1930 |
| 1,952,424 | Day | Mar. 27, 1934 |
| 2,308,602 | Glynn | Jan. 19, 1943 |
| 2,524,156 | Bacon | Oct. 3, 1950 |
| 2,582,715 | Murray | Jan. 15, 1952 |
| 2,597,550 | Tritt | May 20, 1952 |
| 2,645,265 | O'Neil | July 14, 1953 |